United States Patent

Habuchi et al.

Patent Number: 5,851,164
Date of Patent: Dec. 22, 1998

[54] HYDRAULIC CONTROL SYSTEM FOR AUTOMATIC TRANSMISSION OF MULTIPLE CLUTCH TYPE

[75] Inventors: Ryoji Habuchi, Okazaki; Kojiro Kuramochi, Numazu; Masafumi Kinoshita; Akiharu Abe, both of Toyota, all of Japan

[73] Assignee: Toyota Jidosha Kabushiki Kaisha, Toyota, Japan

[21] Appl. No.: 835,643

[22] Filed: Apr. 11, 1997

[30] Foreign Application Priority Data

Apr. 16, 1996 [JP] Japan .................................. 8-093917

[51] Int. Cl.$^6$ .................................................. F16H 61/12
[52] U.S. Cl. .......................... 477/127; 477/131; 477/906
[58] Field of Search .................................. 477/127, 130, 477/131, 143, 906; 74/335, 331

[56] References Cited

U.S. PATENT DOCUMENTS

| | | | |
|---|---|---|---|
| 4,414,863 | 11/1983 | Heino | 477/906 X |
| 4,560,045 | 12/1985 | Walsh . | |
| 4,829,853 | 5/1989 | Sakaguchi | 477/127 X |
| 5,006,093 | 4/1991 | Itoh et al. . | |
| 5,050,715 | 9/1991 | Itoh et al. . | |
| 5,052,247 | 10/1991 | Kato et al. . | |
| 5,067,603 | 11/1991 | Kato et al. . | |
| 5,086,672 | 2/1992 | Kato et al. . | |
| 5,209,141 | 5/1993 | Asayama et al. | 477/906 X |
| 5,235,877 | 8/1993 | Takahashi et al. | 477/123 |
| 5,409,434 | 4/1995 | Furukawa et al. | 477/906 X |
| 5,472,389 | 12/1995 | Ando et al. | 477/906 X |
| 5,505,674 | 4/1996 | Furukawa et al. | 477/130 |
| 5,527,233 | 6/1996 | Tabata et al. . | |

FOREIGN PATENT DOCUMENTS

| | | |
|---|---|---|
| 0 050 944 | 5/1982 | European Pat. Off. . |
| 63-31031 | 6/1988 | Japan . |
| 2 260 172 | 4/1993 | United Kingdom . |
| 2 284 026 | 5/1995 | United Kingdom . |
| WO 87/06669 | 11/1987 | WIPO . |

*Primary Examiner*—Dirk Wright
*Assistant Examiner*—Peter T. Kwon
*Attorney, Agent, or Firm*—Oblon, Spivak, McClelland, Maier & Neustadt, P.C.

[57] ABSTRACT

In a hydraulic control system for an automatic transmission of multiple clutch type for use in a motor vehicle, a shift valve which inverts the supply and cutoff of working oil for a hydraulic actuator serving to change-over gear shift stages is provided with a spool valvule and a clutch-oil-pressure supply port (as shown in FIG. 1). Even when a solenoid valve for controlling the shift valve has failed, a clutch oil pressure is supplied from the clutch-oil-pressure supply port so as to hold the switchover position of the spool valvule and to keep the gear shift stage already established. Thus, the hydraulic control system prevents an engine speed from rising or the motor vehicle from locking due to the failure of the solenoid valve.

1 Claim, 5 Drawing Sheets

FIG.3

| GEAR | C1 | C2 | S1 | | S2 | | SR |
|---|---|---|---|---|---|---|---|
| | | | 1 | 3 | 2 | 4 | |
| REVERSE GEAR | | ◯ | ◯ | | | | ◯ |
| 1ST GEAR | ◯ | | ◯ | | | | |
| 2ND GEAR | | ◯ | | | ◯ | | |
| 3RD GEAR | ◯ | | | ◯ | | | |
| O/D GEAR | | ◯ | | | | ◯ | |

FIG.5

| | 2ND-SPEED PORT | O/D-SPEED PORT | 1ST-SPEED PORT | 3RD-SPEED PORT | GEAR TO BE SELECTED |
|---|---|---|---|---|---|
| "2-4" HYDRAULIC ACTUATOR | ○ | ○ | — | — | NO GEAR (NEUTRAL) |
| | ○ | × | — | — | 2ND GEAR |
| | × | ○ | — | — | 4TH GEAR |
| | × | × | — | — | NO GEAR (NEUTRAL) |
| "1-3" HYDRAULIC ACTUATOR | — | — | ○ | × | 1ST GEAR |
| | — | — | × | ○ | 3RD GEAR |

HYDRAULIC CONTROL SYSTEM FOR AUTOMATIC TRANSMISSION OF MULTIPLE CLUTCH TYPE

BACKGROUND OF THE INVENTION

1. Field of the Invention

The present invention relates to automatic transmissions for motor vehicles, and more particularly to a hydraulic control system for an automatic transmission of multiple clutch type.

2. Description of the Prior Art

There has heretofore been proposed an automatic transmission of multiple clutch type for a motor vehicle, having at least two power transmission shafts each of which transmits power from a driving source to driving wheels, and clutches each of which connects or disconnects the corresponding power transmission shaft on a power transmission path. In general, the multiple clutch type automatic transmission of this sort is furnished on the power transmission shafts with a plurality of speed change gears, and changeover elements for selecting any of the plurality of speed change gears and rendering the selected gear capable of transmitting the power. The changeover elements are selectively brought into engagement by operating hydraulic actuators, accordingly a plurality of gear shift stages are attained.

Because of above construction, clutch oil pressures for controlling the clutches and oil pressures for controlling the hydraulic actuators of the changeover elements need to be controlled by individual or independent solenoid valves.

The official gazette of Japanese Patent Application Publication No. 31031/1988 discloses a hydraulic control system for a motor vehicle, which comprises solenoid valves each of which controls a clutch oil pressure, and solenoid valves each of which controls a shift valve for the supply/cutoff of working oil for the hydraulic actuator of a changeover element.

The hydraulic control system as stated above, however, has the problem that the changeover element malfunctions when, for example, the solenoid valve for controlling the shift valve has failed due to the breaking of wire thereof or the like. Herein, when the changeover element has transferred from an engaged state into a released state by reason of the malfunction and has assumed a neutral position, the speed (r.p.m.) of the engine of the motor vehicle rises, and when it has transferred from the released state into the engaged state, the lock of the motor vehicle occurs.

SUMMARY OF THE INVENTION

The present invention has been made in view of the problem of the prior art as stated above, and has for its object to provide a hydraulic control system for an automatic transmission of multiple clutch type in which, even when a solenoid valve has failed due to breaking of the wire or the like, the state of a changeover element is prevented from transferring, thereby to avoid rise in the speed (r.p.m.) of an engine or the occurrence of the lock of a motor vehicle.

The present invention has achieved the above object by adopting a structure having as its gist illustrated in FIG. 1, which comprises a shift valve including a spool valve, also referred to as a valvule, whose position is switched-over by a solenoid valve so as to invert supply and cutoff of working oil for said hydraulic actuator. The shift valve is formed with a clutch-oil-pressure supply port which is supplied with a clutch oil pressure of said clutch, so as to hold the switcho- ver position of said spool valvule by said clutch oil pressure even when said solenoid valve has failed.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein:

FIG. 3 is a table showing the engagement states of clutches and sleeves in the cases of selecting respective gear shift stages in the aspect of performance illustrated in FIG. 2;

FIG. 5 is a table showing the operations of hydraulic actuators in the above aspect of performance.

DETAILED DESCRIPTION OF THE PREFERRED EMBODIMENTS

Now, examples of the aspects of performance (embodiment) of the present invention will be described in detail with reference to the drawings.

Figure 1:
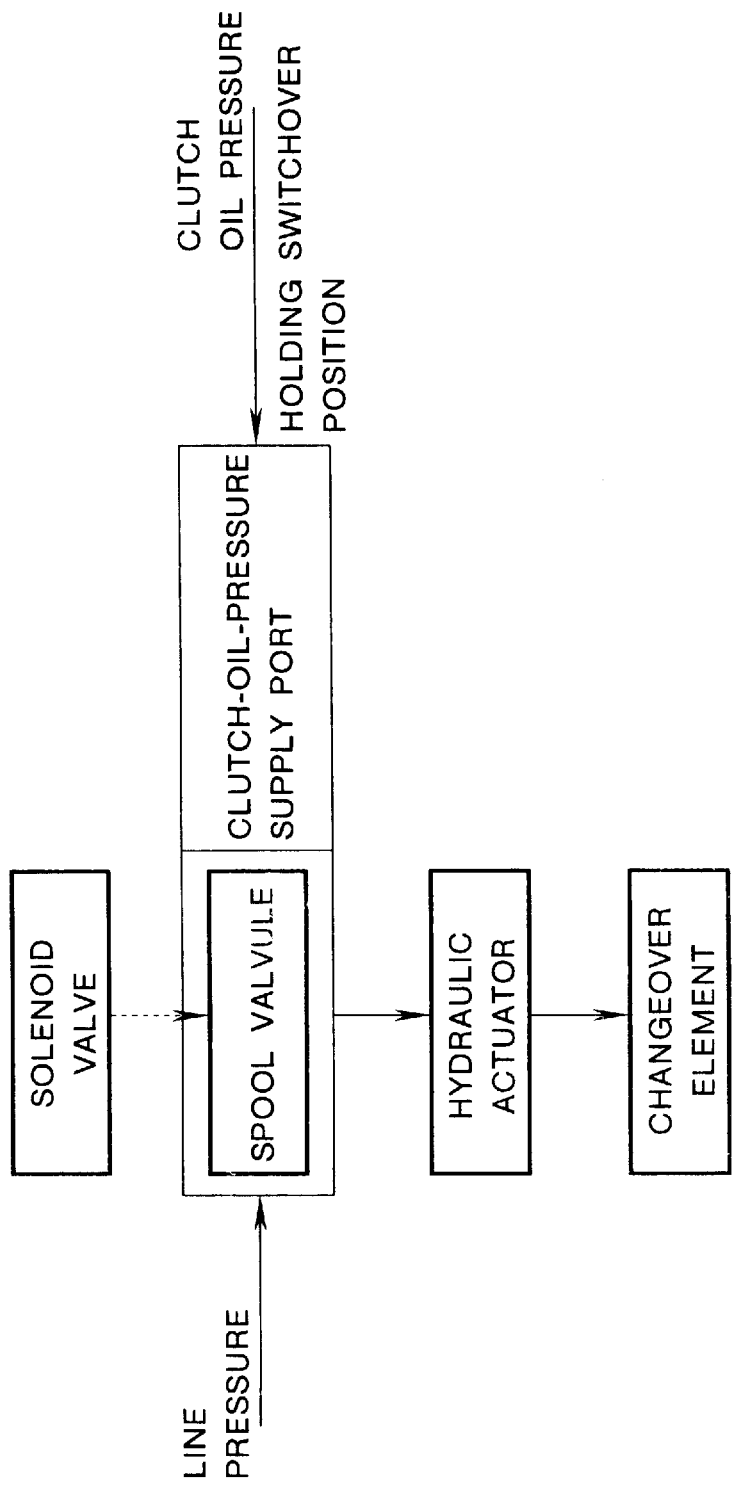
FIG. 1 is a block diagram showing the gist of the present invention.
Figure 2:
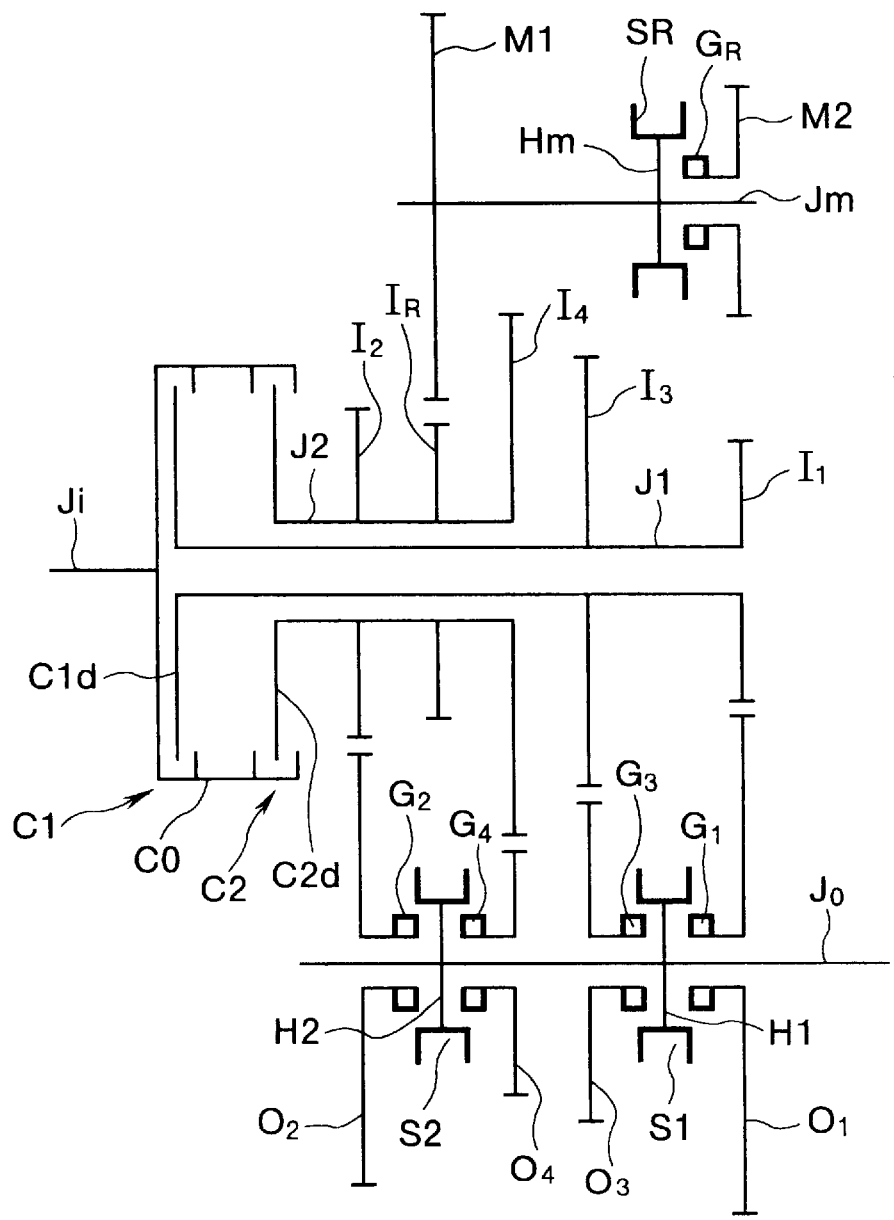
FIG. 2 is a skeleton diagram showing the power transmission system of a multiple clutch type automatic transmission to which the present invention is applied.

FIG. 2 is a skeleton diagram showing the power transmission system of a multiple clutch type automatic transmission to which the present invention is applied.

The multiple clutch type automatic transmission for a motor vehicle has first and second output shafts (power transmission shafts) J1 and J2 each of which transmits power from an unshown engine (driving source) to unshown driving wheels. The automatic transmission also has first and second clutches C1 and C2 which connect or disconnect the first and second output shafts J1 and J2 on power transmission paths, respectively.

In the aspect of performance depicted in FIG. 2, symbol Ji denotes a transmission input shaft, which is joined to a clutch outer-block member CO being common to the first and second clutches C1 and C2. Symbols C1$d$ and C2$d$ denote the discs of the first and second clutches C1 and C2, respectively. The discs C1$d$ and C2$d$ are individually or independently connected to or disconnected from the clutch outer-block member CO.

The first output shaft Ji is joined to the disc C1$d$ of the first clutch C1, while the second output shaft J2 is joined to the disc C2$d$ of the second clutch C2. In this aspect of performance, the first output shaft J1 is disposed inside the second output shaft J2 being hollow. That is, the first and second output shafts J1 and J2 are adapted to rotate round an unshown common central axis.

The first output shaft J1 carries a first-speed-stage (first-gear) drive gear $I_1$ and a third-speed-stage (third-gear) drive gear $I_3$, which correspond to speed change gears, and which are unrotatably (fixedly) mounted on this shaft J1. Also the second output shaft J2 carries a second-speed-stage (second-gear) drive gear $I_2$, a fourth-speed-stage (overdrive-gear) drive gear $I_4$ and a reverse-stage (reverse-gear) drive gear $I_R$ which correspond to speed change gears, and which are unrotatably (fixedly) mounted on this shaft J2. Here, on the second output shaft J2, the reverse-stage drive gear $I_R$ is mounted between the second-speed-stage drive gear $I_2$ and the fourth-speed-stage drive gear $I_4$ in order to shorten the axial dimension of the automatic transmission.

Symbol Jo denotes a transmission output shaft, the central axis (not shown) of which is parallel to the common central axis of the first output shaft J1 and the second output shaft J2. The transmission output shaft Jo carries a first-speed-stage driven gear $O_1$, a second-speed-stage driven gear $O_2$, a third-speed-stage driven gear $O_3$ and a fourth-speed-stage driven gear $O_4$ which are rotatably mounted on this shaft Jo in an order as shown in the figure. In addition, a first hub H1 and a second hub H2 are rotatably mounted between the first-speed-stage driven gear $O_1$ and the third-speed-stage driven gear $O_3$, and between the second-speed-stage driven gear $O_2$ and the fourth-speed-stage driven gear $O_4$, respectively.

The first-speed-stage driven gear $O_1$, second-speed-stage driven gear $O_2$, third-speed-stage driven gear $O_3$ and fourth-speed-stage driven gear $O_4$ are always held in mesh with the first-speed-stage drive gear $I_1$, second-speed-stage drive gear $I_2$, third-speed-stage drive gear $I_3$ and fourth-speed-stage drive gear $I_4$, respectively.

A first-speed-stage clutch gear $G_1$, second-speed-stage clutch gear $G_2$, third-speed-stage clutch gear $G_3$ and fourth-speed-stage clutch gear $G_4$ are mounted on the transmission output shaft Jo so as to rotate unitarily with the first-speed-stage driven gear $O_1$, second-speed-stage driven gear $O_2$, third-speed-stage driven gear $O_3$ and fourth-speed-stage driven gear $O_4$, respectively.

Meanwhile, symbols S1 and S2 denote first and second sleeves (changeover elements), respectively, which serve to select any of the speed change gears and to render the selected gear capable of transmitting the power. The first sleeve S1 is mounted on the outer periphery of the first hub H1 so as to be axially movable and to be unrotatable. When the first-speed stage or reverse stage of the automatic transmission has been selected, the first sleeve S1 brings the first hub H1 into engagement with the first-speed-stage clutch gear $G_1$ provided on the first-speed-stage driven gear $O_1$, thereby to join this driven gear $O_1$ to the transmission output shaft Jo. Besides, when the third-speed-stage has been selected, the first sleeve S1 brings the first hub H1 into engagement with the third-speed-stage clutch gear $G_3$ provided on the third-speed-stage driven gear $O_3$, thereby to join this driven gear $O_3$ to the transmission output shaft Jo.

On the other hand, the second sleeve S2 is mounted on the outer periphery of the second hub H2 so as to be axially movable and to be unrotatable. When the second-speed-stage of the automatic transmission has been selected, the second sleeve S2 brings the second hub H2 into engagement with the second-speed-stage clutch gear $G_2$ provided on the second-speed-stage driven gear $O_2$, thereby to join this driven gear $O_2$ to the transmission output shaft Jo. Besides, when the fourth-speed-stage has been selected, the second sleeve S2 brings the second hub H2 into engagement with the fourth-speed-stage clutch gear $G_4$ provided on the fourth-speed-stage driven gear $O_4$, thereby to join this driven gear $O_4$ to the transmission output shaft Jo.

Not only the first sleeve S1 and second sleeve S2, but also a reverse-stage sleeve SR to be explained later plays the role of a changeover element. Each of the changeover elements operates to selectively couple the corresponding clutch gear and hub while synchronizing the rotation of the clutch gear with that of the hub (that of the corresponding shaft).

Symbol Jm denotes a jackshaft (sub-shaft), the central axis (not shown) of which is parallel to the common central axis of the first output shaft J1 and second output shaft J2 and the central axis of the transmission output shaft Jo.

A first intermediate gear M1 and a jackshaft hub Hm are unrotatably mounted on the jackshaft Jm, and a second intermediate gear M2 is rotatably mounted thereon. The first intermediate gear M1 and second intermediate gear M2 are always held in mesh with the reverse-stage drive gear $I_R$ and first-speed-stage driven gear $O_1$, respectively.

The jackshaft hub Hm is arranged between the first intermediate gear M1 and the second intermediate gear M2 in order to shorten the axial dimension of the automatic transmission. The reverse-stage sleeve SR is mounted on the outer periphery of the jackshaft hub Hm so as to be axially slidable and to be unrotatable. Shown at symbol $G_R$ is the reverse-stage clutch gear, which is selectively engaged with the jackshaft hub Hm through the reverse-stage sleeve SR. The reverse-stage clutch gear $G_R$ is mounted on that axial side of the second intermediate gear M2 which is closer to the first intermediate gear M1, in order to shorten the axial dimension as in the foregoing.

When the reverse stage of the automatic transmission has been selected, the reverse-stage sleeve SR brings the jackshaft hub Hm into engagement with the reverse-stage clutch gear $G_R$ provided on the second intermediate gear M2, thereby to join this gear M2 to the jackshaft Jm.

FIG. 3 tabulates the engagement states of the clutches and sleeves relevant to the individual gear shift stages in the cases where the respective gear shift stages have been selected in this aspect of performance. In the table, mark ○ indicates that the clutch or sleeve lies in its engaged state. Besides, abbreviation O/D signifies "overdrive".

By way of example, at the 1st gear (first-speed stage), the first clutch C1 and the position "1" of the first sleeve S1 bear the marks ○. This indicates that the first clutch C1 is held in engagement, and that the first sleeve S1 holds the first-speed-stage clutch gear $G_1$ and the first hub H1 in engagement.

On this occasion, the power is transmitted along the following path, which shall be denoted by only the symbols for the sake of brevity:

$$Ji \rightarrow CO \rightarrow C1d \rightarrow J1 \rightarrow I_1 \rightarrow O_1 \rightarrow G_1 \rightarrow S1 \rightarrow H1 \rightarrow Jo$$

(S1 is shifted to G1 side so as to hold $G_1$ and H1 into engagement)

The path of the power transmission for the selection of any other gear (any other speed stage) is similar, and shall be omitted from description.

Figure 4:
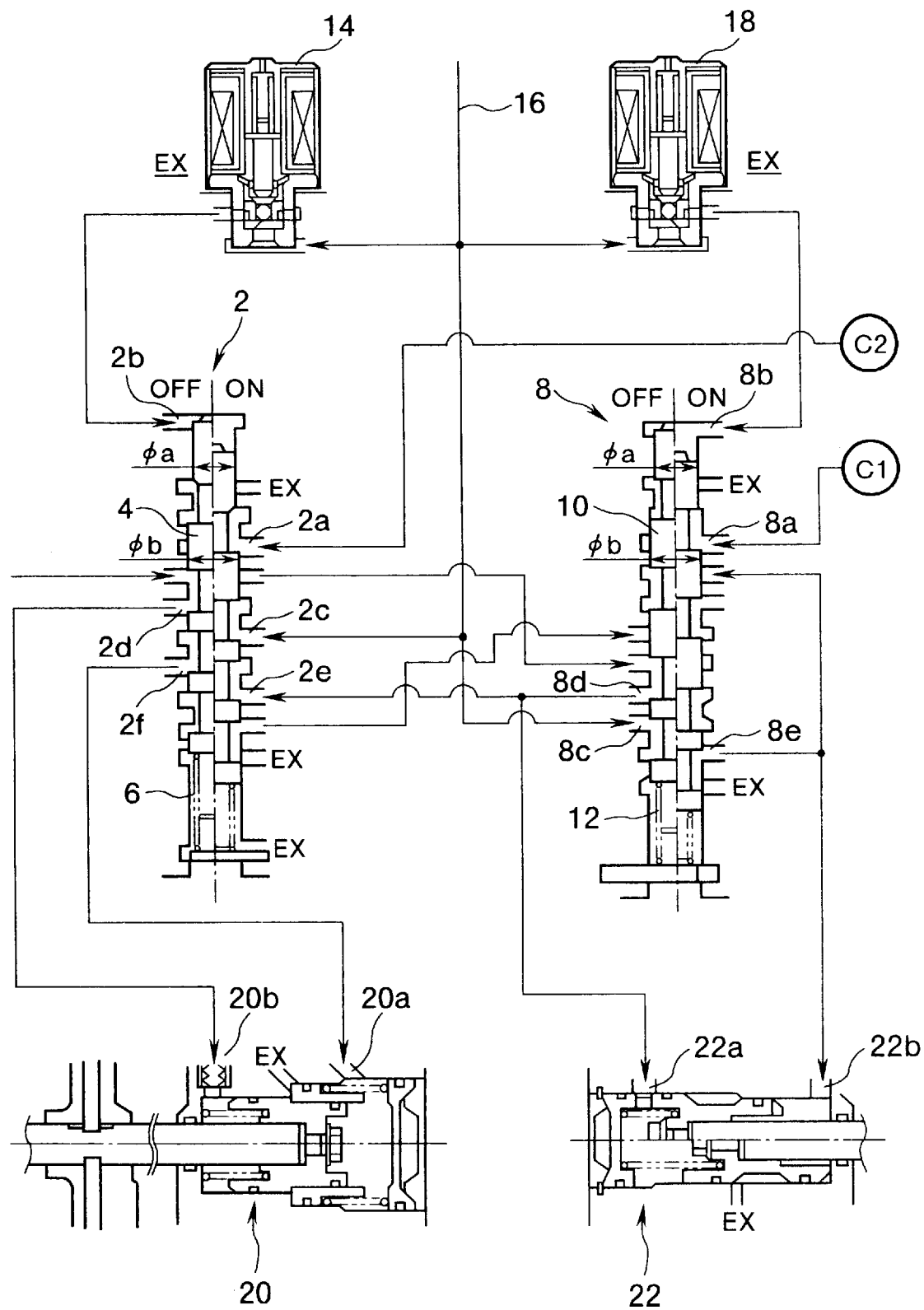
FIG. 4 is a schematic arrangement diagram showing the hydraulic control circuit of the multiple clutch type automatic transmission in the above aspect of performance.

FIG. 4 is a schematic arrangement diagram showing the hydraulic control circuit of the multiple clutch type automatic transmission in this aspect of performance.

The hydraulic control circuit comprises two shift valves (first shift valve 2, second shift valve 8), two solenoid valves (first solenoid valve 14, second solenoid valve 18), and two hydraulic actuators ("2–4" hydraulic actuator 20, "1–3" hydraulic actuator 22).

The "2–4" hydraulic actuator 20 inverts or switches the engagement of the second sleeve S2 being the changeover element. On the other hand, the "1–3" hydraulic actuator 22 inverts the engagement of the first sleeve S1 being the changeover element.

The first shift valve 2 includes a first spool valvule 4, and controls the operation of the "2–4" hydraulic actuator 20. Likewise, the second shift valve 8 includes a second spool valvule 10, and controls the operation of the "1–3" hydraulic actuator 22. The first spool valvule 4 is switched over its own position by the function of the first solenoid valve 14.

Likewise, the second spool valvule 10 is switched over its own position by the function of the second solenoid valve 18.

Now, the structures of the constituents of the hydraulic control circuit will be described in detail.

Referring to FIG. 4, the first shift valve 2 includes a first spring 6 besides the first spool valvule 4 stated above. Likewise, the second shift valve 8 includes a second spring 12 besides the second spool valvule 10. Further, the first shift valve 2 has a clutch-oil-pressure supply port 2a which is supplied with the clutch oil pressure of the second clutch C2, and several other ports 2b–2f. On the other hand, the second shift valve 8 has a clutch-oil-pressure supply port 8a which is supplied with the clutch oil pressure of the first clutch C1, and several other ports 8b–8e.

An oil pressure originating from a D-range (drive range) pressure is supplied from the first solenoid valve 14 into the port 2b of the first shift valve 2 through an oil line 16. Likewise, an oil pressure originating from the D-range pressure is supplied from the second solenoid valve 18 into the port 8b of the second shift valve 8 through the oil line 16.

Here, symbol "Pc1" is let denote a pressing load with which the clutch oil pressure of the first clutch C1 supplied from the clutch-oil-pressure supply port 8a acts on the second spool valvule 10, while symbol "Pc2" is let denote a pressing load with which the clutch oil pressure of the second clutch C2 supplied from the clutch-oil-pressure supply port 2a acts on the first spool valvule 4. In addition, the D-range pressure supplied from the port 2b of the first shift valve 2 acts on the first spool valvule 4 with a pressing load "Posl 1", while the D-range pressure supplied from the port 8b of the second shift valve 8 acts on the second spool valvule 10 with a pressing load "Psol 2".

In the first shift valve 2, the pressing loads Pc2 and Psol 1 counter a load "Pspr 1" based on the first spring 6, while in the second shift valve 8, the pressing loads Pc1 and Psol 2 counter a load "Pspr 2" based on the second spring 12. The relations of the magnitudes of these loads are set so as to satisfy the following inequalities:

Pc2>Pspr 1

Psol 1>Pspr 1

Pc1>Pspr 2

Psol 2>Pspr 2

The positions of the first spool valvule 4 and second spool valvule 10 are respectively switched over by the loads based on the above oil pressures, until the D-range pressure is supplied to the "2–4" hydraulic actuator 20 or "1–3" hydraulic actuator 22.

In FIG. 4, the states of each of the first and second shift valves 2 and 8 are depicted at left and right parts divided by a center line. Herein, the left side represents the OFF state in which the oil pressures do not act, so that the first or second spool valvule 4 or 10 is pushed up by the spring load Pspr 1 or Pspr 2. On the other hand, the right side represents the ON state in which the oil pressures act, so that the first or second spool valvule 4 or 10 is pushed down.

The "2–4" hydraulic actuator 20 has a second-speed (second-gear) port 20a and a fourth-speed (fourth- or overdrive-gear) port 20b, and inverts the engagement of the second sleeve S2 to change over the second-speed stage and the fourth-speed stage as stated before. On the other hand, the "1–3" hydraulic actuator 22 has a first-speed (first-gear) port 22a and a third-speed (third-gear) port 22b, and inverts the engagement of the first sleeve S1 to change over the first-speed stage and the third-speed stage as stated before.

The "2–4" hydraulic actuator 20 and "1–3" hydraulic actuator 22 operate as tabulated in FIG. 5. In the figure, mark ○ indicates that the oil pressure is supplied into the particular port, whereas mark X indicates that the oil pressure is discharged from the particular port. In addition, mark— indicates that the corresponding hydraulic actuator is not relevant to the pertinent gear shift stage.

By way of example, in a case where the oil pressure is supplied into the first-speed port 22a of the "1–3" hydraulic actuator 22 and where the oil pressure is discharged from the third-speed port 22b, the first sleeve S1 brings the first-speed-stage clutch gear $G_1$ and the first hub H1 into engagement, and the first-speed stage (first gear) is selected. On this occasion, as indicated in FIG. 3, the first-speed stage (first gear) is established when the first clutch C1 has come into engagement under the action of the clutch oil pressure. The other gear shift stages are similarly established.

Incidentally, the engagement of the reverse-stage sleeve SR is effected in such a way that the reverse stage (reverse gear) is selected by a reverse-stage hydraulic actuator not shown.

The first (or second) solenoid valve 14 (or 18) is a normally-closed solenoid valve. When the driving power source of the hydraulic control circuit is ON, the valve 14 (or 18) is opened to introduce the D-range pressure into the port 2b (or 8b) of the first shift valve 2 (or second shift valve 8), whereupon the oil pressure acts on the first spool valvule 4 (or second spool valvule 10). In contrast, when the driving power source is OFF, the valve 14 (or 18) is closed to block the D-range pressure, whereupon the oil pressure is discharged from the port 2b (or 8b).

Herein, the first spool valvule 4 (or second spool valvule 10) of the first shift valve 2 (or second shift valve 8) is controlled by the oil pressure. However, such control is not restrictive, but the spool valvule 4 (or 10) may well be directly driven by a solenoid for example.

Now, the operation of this aspect of performance will be described in detail.

First, there will be explained a case where the first-speed stage (first gear) and neutral position of the automatic transmission are selected.

On condition that the driving power source is ON, the first and second solenoid valves 14 and. 18 are opened to supply the port 2b of the first shift valve 2 and the port 8b of the second shift valve 8 with the D-range pressure fed from the oil line 16, respectively.

The oil pressures fed from the ports 2b and 8b urge the first spool valvule 4 and second spool valvule 10 with the pressing loads Psol 1 and Psol 2, respectively. These loads Psol 1 and Psol 2 overcome the bias loads Pspr 1 and Pspr 2 of the first and second springs 6 and 12 and push down the first and second spool valvules 4 and 10, respectively. Accordingly, both the first and second shift valves 2 and 8 assume the right-side ON states in FIG. 4. On this occasion, the ports 2c and 2d of the first shift valve 2 and the ports 2e and 2f thereof communicate with each other, and the ports 8c and 8d of the second shift valve 8 communicate with each other.

In consequence, the D-range pressure fed from the oil line 16 is supplied from the port 2c of the first shift valve 2 via the port 2d thereof into the fourth-speed port 20b of the "2–4" hydraulic actuator 20. Besides, the D-range pressure fed into the port 8c of the second shift valve 8 is supplied from the port 8d thereof into the first-speed port 22a of the "1–3" hydraulic actuator 22. Further, the D-range pressure is also supplied into the second-speed port 20a of the "2–4" hydraulic actuator 20 through the ports 2e and 2f of the first shift valve 2.

On this occasion, the oil pressures are supplied into the second-speed port 20a and fourth-speed port 20b of the "2–4" hydraulic actuator 20 and the first-speed port 22a of the "1–3" hydraulic actuator 22. As seen from FIG. 5, therefore, the transmission has the first-speed stage (first gear) and the neutral position selected.

Here, when the first clutch C1 is subjected to the clutch oil pressure till engagement, the transmission settles to the first-speed stage as indicated in the engagement table of FIG. 3. On this occasion, the clutch oil pressure of the first clutch C1 affects the clutch-oil-pressure supply port 8a of the second shift valve 8 and bestows the pressing load Pc1 on the second spool valvule 10.

It is assumed here that the first or second solenoid valve 14 or 18 has malfunctioned due to a failure of wire breaking or the like. By way of example, it is assumed that an electric current to flow to the second solenoid valve 18 has stopped, so the valve 18 has closed to cut off the oil pressure for the port 8b of the second shift valve 8. On this occasion, if the contrivance of the present invention is not applied, the second spool valvule 10 is pushed up by the pressing load Pspr 2 of the second spring 12, and the second shift valve 8 falls into the OFF state. Therefore, the ports 8c and 8d have their communication cut off, and the ports 8c and 8e come into communication. As a result, the D-range pressure is supplied into the third-speed port 22b to change the first-speed stage over to the third-speed stage.

In this aspect of performance, however, the clutch oil pressure of the first clutch C1 is held supplied from the port 8a, and the pressing load Pc1 is acting on the second spool valvule 10. Moreover, the second spool valvule 10 is endowed with an areal difference (diameter a<diameter b) as shown in FIG. 4. In consequence, the second spool valvule 10 is pushed down by the clutch oil pressure of the first clutch C1, and the second shift valve 8 is held in the ON state, so that the first speed stage is kept. Accordingly, the settlement of the gear shift stage of the transmission does not collapse.

In this manner, even when the second solenoid valve 18 for switching over the position of the second spool valvule 10 of the second shift valve 8 has failed, the clutch-oil-pressure supply port 8a of the second shift valve 8 is held supplied with the clutch oil pressure of the first clutch C1, and hence, the switchover position of the second spool valvule 10 is held by the clutch oil pressure. Accordingly, the supply of the oil pressure from the second shift valve 8 to the "1–3" hydraulic actuator 22 is not inverted to the cutoff thereof, and the gear shift stage before the failure of the second solenoid valve 18 is kept.

Next, there will be explained a case where the first-speed stage (first gear) and second-speed stage (second gear) of the automatic transmission are selected.

On condition that the driving power source is OFF, the first solenoid valve 14 is closed to cut off the supply of the D-range pressure for the port 2b. Since the pressing load Psol 1 does not act on the first spool valvule 4, the first spool valvule 4 is pushed up by the load Pspr 1 based on the first spring 6, and the first shift valve 2 falls into the OFF state. On this occasion, the ports 2c and 2f of the first shift valve 2 communicate with each other, and the D-range pressure is supplied into the second-speed port 20a of the "2–4" hydraulic actuator 20.

Meanwhile, on condition that the driving power source is ON, the second solenoid valve 18 is opened to supply the D-range pressure into the port 8b of the second shift valve 8. The second spool valvule 10 is pushed down by the pressing load Psol 2 based on the D-range pressure, and the second shift valve 8 falls into the ON state. On this occasion, the ports 8c and 8d of the second shift valve 8 communicate with each other, so that the D-range pressure is supplied into the first-speed port 22a of the "1–3" hydraulic actuator 22.

Thus, the transmission has the first-speed stage and the second-speed stage selected. Here, when the first clutch C1 is engaged, the transmission settles to the first-speed stage.

On this occasion, even when the second solenoid valve 18 has malfunctioned to cut off the supply of the oil pressure into the port 8b of the second shift valve 8, the clutch oil pressure of the first clutch C1 is affecting the clutch-oil-pressure supply port 8a, and hence, the second spool valvule 10 has its position held. Accordingly, the settlement of the gear shift stage of the transmission does not collapse.

That is, also in this case, as in the foregoing, the switchover position of the second spool valvule 10 is held by the clutch oil pressure of the first clutch C1 fed into the clutch-oil-pressure supply port 8a of the second shift valve 8, and the gear shift stage already established is kept.

Besides, when the second clutch C2 is engaged in the state in which the first-speed stage and second-speed stage are selected, the transmission settles to the second-speed stage.

On this occasion, even when the first solenoid valve 14 has failed due to breaking of wire, the established state remains unchanged for the reason that the first shift valve 2 is originally in the OFF state and has its port 2b supplied with no oil pressure, so no oil pressure is affecting the first spool valvule 4. Further, even when the second solenoid valve 18 has malfunctioned, the first clutch C1 is not in engagement. Accordingly, the settlement of the gear shift stage of the transmission does not collapse.

Next, there will be explained a case where the second-speed stage (second gear) and third-speed stage (third gear) of the automatic transmission are selected.

When the driving power source is OFF for both the first solenoid valve 14 and second solenoid valve 18, no oil pressure affects the port 2b of the first shift valve 2 and the port 8b of the second shift valve 8. Accordingly, the first spool valvule 4 and second spool valvule 10 are respectively pushed up by the load Pspr 1 of the first spring 6 and the load Pspr 2 of the second spring 12, and both the first shift valve 2 and second shift valve 8 fall into the OFF states.

On this occasion, the ports 2c and 2f communicate with each other in the first shift valve 2, so that the D-range pressure is supplied into the second-speed port 20a of the "2–4" hydraulic actuator 20. Simultaneously, the ports 8c and 8e communicate with each other in the second shift valve 8, so that the D-range pressure is supplied into the third-speed port 22b of the "1–3" hydraulic actuator 22. Thus, the transmission has the second-speed stage and the third-speed stage selected.

When the second clutch C2 has been engaged, the transmission settles to the second-speed stage. Here, even when the first solenoid valve 14 has failed due to breaking of wire, the OFF state of the first shift valve 2 remains unchanged for the reason that the port 2b of the first shift valve 2 is originally supplied with no oil pressure. Besides, even when the second solenoid valve 18 has malfunctioned, the first clutch C1 is not in engagement. Accordingly, the settlement of the gear shift stage of the transmission does not collapse.

Further, when the first clutch C1 is engaged in the state in which the second-speed stage and third-speed stage are selected, the transmission settles to the third-speed stage. Here, even when the second solenoid valve 18 has failed due to breaking of wire, the OFF state of the second shift valve 8 remains unchanged for the reason that the port 8b of the second shift valve 8 is originally supplied with no oil pressure. Besides, even when the first solenoid valve 14 has malfunctioned, the second clutch C2 is not in engagement. Accordingly, the settlement of the gear shift stage of the transmission does not collapse.

Lastly, there will be explained a case where the third-speed stage (third gear) and fourth-speed stage (overdrive gear) of the automatic transmission are selected.

When the driving power source is turned ON for the first solenoid valve 14 and OFF for the second solenoid valve 18, the D-range pressure is supplied into the port 2b of the first shift valve 2 and not into the port 8b of the second shift valve 8. Accordingly, the first spool valvule 4 receives the load Psol 1 and is pushed down, so that the first shift valve 2 falls into the ON state. In contrast, the second spool valvule 10 does not receive any load, so that the second shift valve 8 falls into the OFF state. In the first shift valve 2, the ports 2c and 2d communicate to supply the oil pressure into the fourth-speed port 20b of the "2–4" hydraulic actuator 20. On the other hand, in the second shift valve 8, the ports 8c and 8e communicate to supply the oil pressure into the third-speed port 22b of the "1–3" hydraulic actuator 22.

As a result, the transmission has the third-speed stage and the fourth-speed stage selected. Here, when the second clutch C2 is engaged, the transmission settles to the fourth-speed stage. On this occasion, even when the first solenoid valve 14 and second solenoid valve 18 have malfunctioned, the clutch oil pressure of the second clutch C2 is affecting the clutch-oil-pressure supply port 2a of the first shift valve 2, and the switchover position of the first spool valvule 4 is held by the clutch oil pressure. Besides, the first clutch C1 is not in engagement. Therefore, the settlement of the gear shift stage of the transmission does not collapse.

Besides, when the first clutch C1 is engaged in that state of the transmission in which the third-speed stage and fourth-speed stage are selected, the transmission settles to the third-speed stage.

Here, even when the second solenoid valve 18 has failed due to breaking of wire, the established state remains unchanged for the reason that no oil pressure is originally affecting the port 8b of the second shift valve 8. Further, even when the first solenoid valve 14 has malfunctioned, the second clutch C2 is not in engagement. Accordingly, the settlement of the gear shift stage of the transmission does not collapse.

Thus, according to this aspect of performance, even when the first and second solenoid valves 14 and 18 have undergone malfunctions such as breaking of wire, the gear shift stage already established can be secured, and any abrupt fluctuation and the disconnection of power can be prevented.

As described above, according to the present invention, even in a case where a solenoid valve has failed due to breaking of wire or the like, a gear shift stage already established is kept, whereby rise in the speed (r.p.m.) of an engine and the lock of a motor vehicle can be prevented.

What is claimed is:

1. A hydraulic control system for an automatic transmission of multiple clutch type having at least two power transmission shafts each of which transmits power from a driving source to driving wheels, as well as clutches each of which connects or disconnects the corresponding power transmission shaft on the power transmission path, and being further furnished on said power transmission shafts with a plurality of speed change gears, as well as changeover elements which serve to select any of the plurality of speed change gears and to render the selected gear capable of transmitting the power, wherein said changeover elements are selectively brought into engagement by operating hydraulic actuators, thereby to attain a plurality of gear shift stages, comprising:

a solenoid valve;

a shift valve including a spool valvule whose position is switched-over by said solenoid valve so as to invert supply and cutoff of working oil for said hydraulic actuator, and thereby selectively cause at least one of said changeover elements to select one of the plurality of speed change gears and render the selected gear capable of transmitting the power;

said shift valve being formed with a clutch-oil-pressure supply port which is supplied with a clutch oil pressure of said clutch, so as to hold the switchover position of said spool valvule by said clutch oil pressure even when said solenoid valve has failed.

* * * * *